(12) United States Patent
Rodriquez

(10) Patent No.: US 8,827,158 B2
(45) Date of Patent: Sep. 9, 2014

(54) MULTI-CHIP CARD

(75) Inventor: Jean-Michel Rodriquez, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 13/600,354

(22) Filed: Aug. 31, 2012

(65) Prior Publication Data

US 2013/0161390 A1   Jun. 27, 2013

(30) Foreign Application Priority Data

Dec. 21, 2011   (EP) .................................... 11306717

(51) Int. Cl.
*G06K 7/06*   (2006.01)
(52) U.S. Cl.
USPC .......................................... 235/441; 235/487
(58) Field of Classification Search
USPC .............. 235/375, 380, 382, 382.5, 487, 492, 235/441
See application file for complete search history.

(56) References Cited

U.S. PATENT DOCUMENTS

| | | | |
|---|---|---|---|
| 4,700,055 A | 10/1987 | Kashkashian, Jr. | |
| 5,912,453 A | 6/1999 | Gungl et al. | |
| 7,191,952 B2 | 3/2007 | Blossom | |
| 7,535,719 B2 * | 5/2009 | Hiew et al. | 361/737 |
| 2006/0208066 A1 * | 9/2006 | Finn et al. | 235/380 |

FOREIGN PATENT DOCUMENTS

| | | |
|---|---|---|
| DE | 19737565 A1 | 3/1999 |
| DE | 19832486 A1 | 1/2000 |
| FR | 2627880 A1 | 9/1989 |
| KR | 20100024195 A | 3/2010 |
| WO | 9015382 A1 | 12/1990 |
| WO | 9814916 A2 | 4/1998 |
| WO | 03010713 A1 | 6/2003 |
| WO | 2008084689 A1 | 7/2008 |

OTHER PUBLICATIONS

Application No. GB1222027.3, Examination Report dated Mar. 13, 2014, 3 pages.
Application No. GB1222027.3, Combined Search and Examination Report dated May 15, 2013, 5 pages.

* cited by examiner

*Primary Examiner* — Karl D Frech
(74) *Attorney, Agent, or Firm* — Jean M. Sullivan; Hoffman Warnick LLC

(57) ABSTRACT

A multi-chip card comprises a plurality of sub-cards, each sub-card including an integrated circuit chip. Each chip comprises electrical contacts, and each of the sub-cards may be moved to occupy an active position of the card.

13 Claims, 10 Drawing Sheets

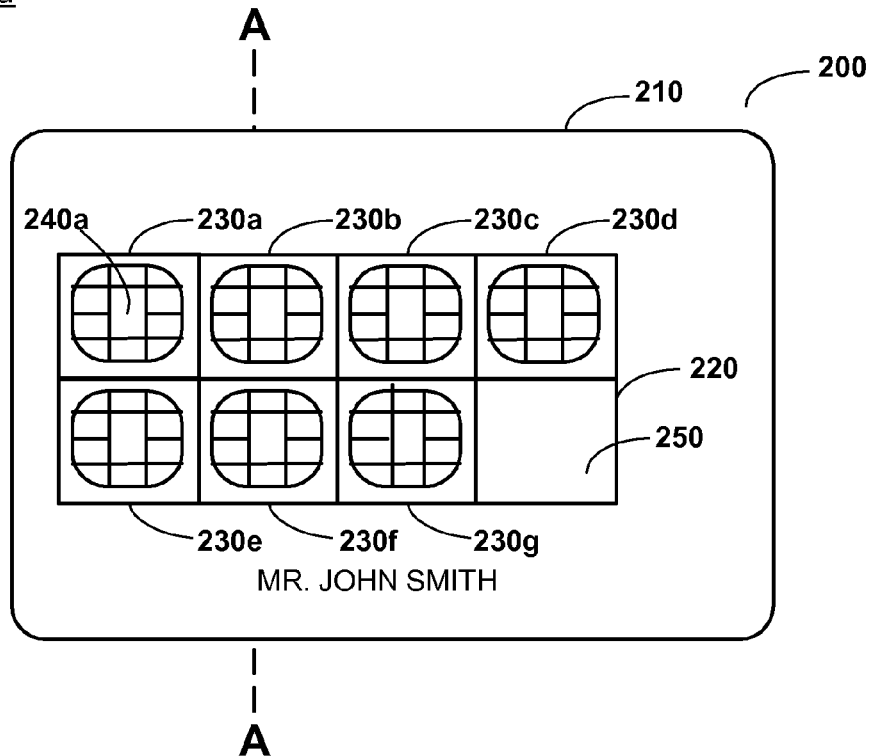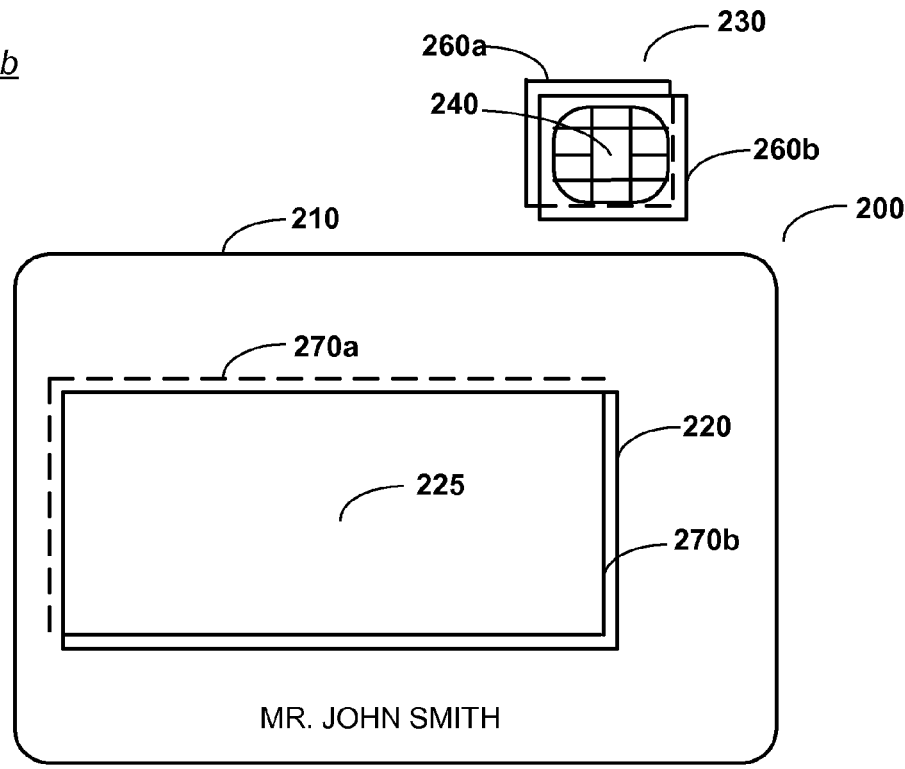

MULTI-CHIP CARD

TECHNICAL FIELD

The present invention relates to cards comprising embedded integrated circuits, for example bank credit and debit cards. More particularly, it relates to such cards containing a plurality of integrated circuits.

RELATED ART

It is well known to provide an electronic identification card comprising an embedded integrated circuit (known as a chip) containing digitally encoded information. This is colloquially known as a chip card or smart card. Most commonly, this will be of the contact variety in which flat conductive contacts on one face of the card provide an electronic interface to the integrated circuit. Many hundreds of millions of such cards are in use worldwide. The major use for these cards is as credit or debit cards issued to account holders by banks and other financial institutions. Other uses include personal identification cards, health entitlement cards, store loyalty cards, stored value cards (electronic purses), information storage cards, and the like. The majority of chip cards conform to international standard ISO/IEC 7816 which specifies aspects of the card such as the positioning of the integrated circuit and contacts, the layout of the contacts, and their functions. The majority are the same size as the previous generation of credit and debit cards and the like in which information is encoded solely on a magnetic stripe. These cards are covered by international standard ISO/IEC 7810, ID-1 format, which specifies dimensions of 85.60 mm ($85.60 \times 10^{-3}$ m) long by 53.98 mm ($53.98 \times 10^{-3}$ m) wide. In addition, international standard ISO/IEC 7813 further specifies the thickness as 0.76 mm ($0.76 \times 10^{-3}$ m).

As the use of chip cards increases, so also does the number of cards which a user must carry. Various solutions have been proposed to allow a single card to perform multiple functions.

United States patent no. U.S. Pat. No. 4,700,055 discloses a system which enables a user to carry one credit card instead of many. The information pertaining to each credit card account, such as the name of the account, the number of the account, and its expiration date, are encoded on the card, by magnetic means, with a semiconductor memory device, or using any other means of recording data. The invention also includes a microprocessor-based system which accepts the card, determines whether the credit card account selected for use by the owner of the card is valid, and prints a credit card invoice. The single card can thus be used in place of a large number of different credit cards.

United States patent no. U.S. Pat. No. 5,912,453 discloses integration of multiple application programs on one chip card, whereby the application programs stored on it do not have access to each other, which is achieved through a separation and decoupling of the individual programs from one another.

United States patent no. U.S. Pat. No. 7,191,952 discloses a selectable multi-purpose card comprising a plurality of features stored in a memory storage device operatively mounted on the card. The plurality of features allows the card to function as multiple cards, and a selection device mounted on the card enables a user to select any of the plurality of card features in a single step.

France patent no. FR 2627880 discloses a smart card comprising several integrated circuit chips placed with their contacts for access to locations corresponding to a normalized position of the card. Each integrated circuit corresponds to a clearly defined function of the card and the choice of the function to be implemented is determined by the direction of orientation of the card when introduced into a card reader.

WIPO International published patent application no. WO 98/14916 also discloses a smart card comprising up to four integrated circuit chips placed with their contacts for access by a card reader depending on the orientation of the card.

SUMMARY OF THE INVENTION

It would be advantageous to provide a card having multiple functions on one card but not requiring any modifications to the reading system. It would also be advantageous to provide a card having multiple functions, these being selectable by the user, and allowing more than four separate integrated circuits on a single card. It would further also be advantageous to allow flexibility as to which integrated circuits are mounted on a single card.

Accordingly, viewed from a first aspect the present invention provides a multi-chip card comprising a plurality of sub-cards. At least one of the plurality of subcards comprises an integrated circuit chip, and the integrated circuit chip comprises electrical contacts. At least one of the plurality of sub-cards is operable for moving to occupy an active position of the card.

The present invention provides a multi-chip card operable for inserting into a chip card reader. The electrical contacts of the integrated circuit chip at the active position are operable for communicating with the reader by electrical contacts in the reader.

The present invention provides a multi-chip card further comprising a card body. The card body comprises a plurality of edges along the periphery of the card, and a cutaway portion suitably spaced from one of the plurality of edges of the card body. The cutaway portion comprises a plurality of edges suitably arranged substantially parallel to or at right angles to the one of the plurality of card body edges, and the cutaway portion extends at least part way through the thickness of the card body.

The present invention provides a multi-chip card in which a sub-card comprises a front face comprising electrical contacts. The sub-card further comprises edges which are operable for being slideably engageable with an edge of the card cutaway portion and an edge of an adjacent sub-card.

The present invention provides a multi-chip card in which sub-cards are slideably engageable by respective complementing protruding and recessed edge profiles of sub-cards and the card cutaway portion.

The present invention provides a multi-chip card in which the slideable engagement is by a tongue and groove mechanism.

The present invention provides a multi-chip card in which the card body comprises a section extending between the cutaway portion and a card body edge, the section operable for removing, so that a sub-card may be removed or added.

Viewed from a second aspect, the invention provides a method of manufacturing a multi-chip card. The method comprises providing a card body which comprises a plurality of edges along the periphery of the card, and a cutaway portion suitably spaced from one of the plurality of edges of the card body. The cutaway portion comprises a plurality of edges suitably arranged parallel to or at right angles to the one of the plurality of card body edges, and the cutaway portion extends at least part way through the thickness of the card body. A plurality of sub-cards is also provided. At least one of the plurality of sub-cards comprises an integrated circuit chip, the integrated circuit chip comprising electrical contacts, and further comprises edges which are operable for being slideably engageable with an edge of the card cutaway portion and an edge of an adjacent sub-card. A plurality of sub-cards is inserted into the cutaway portion The present invention provides a method of manufacturing a multi-chip card which further comprises providing a card body comprising a section extending between the cutaway portion and a card body edge. The section is operable for removing, so that a sub-card may be removed or added.

The present invention provides a method of manufacturing a multi-chip card comprising one or more of the processes of cutting, stamping, laminating, or moulding.

Viewed from a third aspect, the invention provides a method of using a multi-chip card, comprising providing a plurality of sub-cards. At least one of the plurality of sub-cards comprises an integrated circuit chip, and the integrated circuit chip comprises electrical contacts, and the at least one of the plurality of sub-cards is operable for moving to occupy an active position of the card. The card is inserted into a chip card reader so that the electrical contacts of the integrated circuit chip at the active position are operable for communicating with the reader by electrical contacts in the reader. The integrated circuit chip at the active position may then be addressed by the card reader.

The present invention provides a method of using a multi-chip card in which the at least one of the plurality of sub-cards comprises a discrete function relative to a second of the plurality of sub-cards.

BRIEF DESCRIPTION OF THE DRAWINGS

Embodiments of the invention will now be described in detail by way of example only with reference to the following drawings.

FIG. 2a illustrates a plan view of the front face of a multi-chip card according to embodiments of the present invention.

FIG. 2b illustrates the constituent parts of a multi-chip card, a card frame with a cutaway central section and a single sub-card suitable for use therein, according to embodiments of the present invention.

FIG. 4a illustrates a cross-sectional view of a multi-chip card according to embodiments of the present invention, as viewed from its edge or shortest dimension, taken along the section A-A shown in FIG. 2a.

FIG. 4b illustrates a cross-sectional view of a multi-chip card according to additional embodiments of the present invention, as viewed from its edge or shortest dimension, taken along the section A-A shown in FIG. 2a.

FIG. 5c illustrates a cross-sectional view of a multi-chip card according to additional embodiments of the present invention, as viewed from its edge or shortest dimension, taken along the section A-A shown in FIG. 2a.

DETAILED DESCRIPTION

Figure 1A:
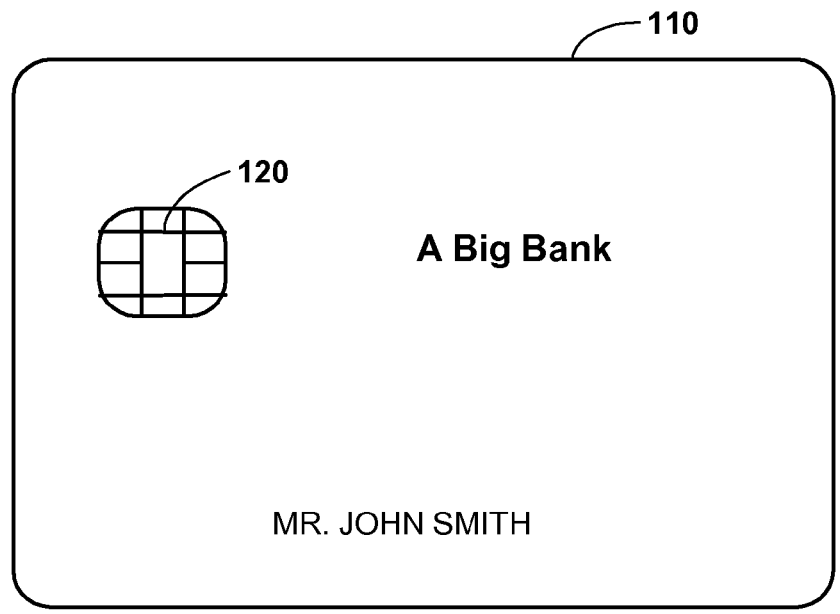
FIG. 1a illustrates an arrangement of a smart card comprising a single embedded integrated circuit, according to the prior art.

FIG. 1a illustrates a chip card as well known in the prior art. The term chip card is used herein for cards comprising integrated circuits. The terms smart card and integrated circuit card are among other terms that have also been used in the prior art. Card body 110 is of standard dimensions, for example as specified by ISO/IEC standards. Card body 110 is formed of a suitable material, usually a plastic material such as polyvinyl chloride (PVC), although other materials such as paper-based substrates may be used. The term front face is used herein to describe a major face of the card comprising electrical contacts. On the front face the card are electrical contacts 120 of an electrically conductive metal such as gold or aluminium. The contacts 120 provide an interface to an embedded integrated circuit (or chip) within the card body. The position of the contacts 120 is specified by ISO/IEC standards. When the card is inserted into a card reader (not shown) further electrical contacts in the card reader mechanism make electrical contact with the contacts 120 on the card to provide addressable access to the information stored in the card chip.

Figure 1B:
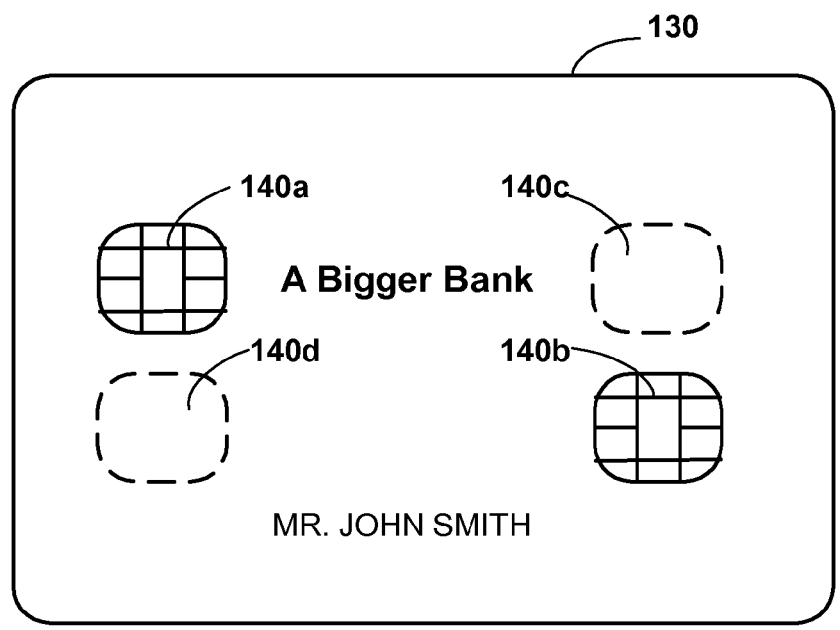
FIG. 1b illustrates an arrangement of a smart card comprising multiple integrated circuits, as disclosed in the prior art.

FIG. 1b illustrates a multi-chip card according to prior art as disclosed by France patent no. FR 2627880 and International published application no. WO 98/14916. In this prior art, a single chip card may contain up to four integrated circuits and associated contacts. The contacts are positioned so as to provide access to a different integrated circuit depending on how the card is orientated. Card 130 has contacts 140a and 140b on the front face of the card, diagonally opposite each other. Contacts 140a are presented to a card reader when the card is inserted orientated in a conventional manner. Rotating the card through 180 degrees presents contacts 140b to the reader. Turning the card over reveals two contacts 140c and 140d on the reverse of the card. These may be inserted into a card reader in a manner similar to those on the front face.

FIG. 2a shows a multi-chip chip card 200 as viewed from the front face of the card according to embodiments of the present invention. Card body 210 of card 200 has dimensions in accordance with those of known chip cards, for example in accordance with ISO/IEC standards for ISO/IEC 7810, ID-1 format. The two major edge dimensions of the card will hereinafter be termed length for the longer and width for the shorter, and the third much smaller edge dimension will be termed thickness and will hereinafter be referred to as the card edge. Electrical contacts 240a are in the same position relative to card body 210 as are contacts 120 on known chip card 110 of the prior art of FIG. 1a. This position will hereinafter be termed the active position of the card. Insertion of the multi-chip card 200 as illustrated in FIG. 2a into a card reader will cause card reader contacts to make contact with contacts 240a and so enable the card reader to address the contents of the integrated circuit associated with contacts 240a at this active position.

Multi-chip card 200 comprises card body 210 which, viewed from the front face, comprises a cutaway portion 220 spaced from each length and width edge of card body 210 and surrounded by the card body 210. As illustrated in FIG. 2a, cutaway portion 220 is rectangular in shape with length and width edges parallel with, respectively, length and width edges of card body 210. In embodiments, cutaway portion 220 comprises the full thickness of card body 210. Card 200 comprises in addition a plurality of individual smaller cards, or sub-cards, 230a to 230g. Sub-cards 230a to 230g are substantially identical to each other and rectangular in shape as viewed from the front face of card 200. Each sub-card 230a to 230g comprises an embedded integrated circuit chip comprising contacts on at least the face visible when viewed from the front face of card 200. A generic sub-card 230 is illustrated in FIG. 2b comprising electrical contacts 240. In FIG. 2a, sub-card 230a comprises contacts 240a in the active position to be read by a card reader on insertion therein of card 200.

As depicted in FIG. 2a, each sub-card 230a to 230g is independently moveable with respect to each other and to card body 210. Each sub-card 230a to 230g is in a slideably engageable relationship with adjacent sub-cards and with the edges of cutaway portion 220 of card body 210. Each sub-card 230a to 230g is therefore retained securely within cutaway portion 220. Each sub-card 230a to 230g is operable for movement within cutaway portion 220 along two axes of movement parallel to respectively length and width of card 200. Cutaway portion 220 is of length and width dimensions corresponding to an integer multiple of, respectively, the length and width of each sub-card 230a to 230g. It will be apparent that in embodiments the number of sub-cards which may be accommodated within cutaway portion 220 of card body 210 is the product of multiplying the sub-card width multiple (y) by the sub-card length multiple (x), minus one (xy−1) to leave a space to allow sub-cards to be moved around. As shown in FIG. 2a, cutaway portion 220 is two sub-card widths by four sub-card lengths in size. The number of sub-cards of generic form 230, for example sub-cards 230a to 230g, which may be accommodated within cutaway portion 220 and allow movement of individual sub-cards is therefore xy−1, or (2×4)−1, i.e. seven (7) sub-cards. In FIG. 2a therefore, seven (7) sub-cards 230a to 230g are individually moveable. From the position illustrated in FIG. 2a, sub-cards 230d and 230g are adjacent to space 250. Either sub-card 230d or sub-card 230g may be moved to occupy space 250.

FIG. 2b illustrates the engaging arrangement according to embodiments of the present invention. As shown, a slideable engagement may be provided using a tongue and groove arrangement. When viewed from the front face of card 200, each sub-card 230 comprises a tongue arrangement 260a on two adjacent edges and a groove arrangement 260b on the opposite two adjacent edges. In the illustrated embodiment, tongue 260a is along top and left edges of sub-card 230 and groove 260b is along right and bottom edges of sub-card 230. Cutaway portion 220 of card body 210 comprises groove arrangement 270a corresponding to tongue 260a along two adjacent edges of cutaway portion 220, and tongue arrangement 270b corresponding to groove 260b on the opposite two adjacent edges of cutaway portion 220. In operation of card 200 therefore, tongues 260a of each sub-card 230 may mateably engage corresponding groove 270a of card body 210, or groove 260b of an adjacent sub-card.

Figure 2C:
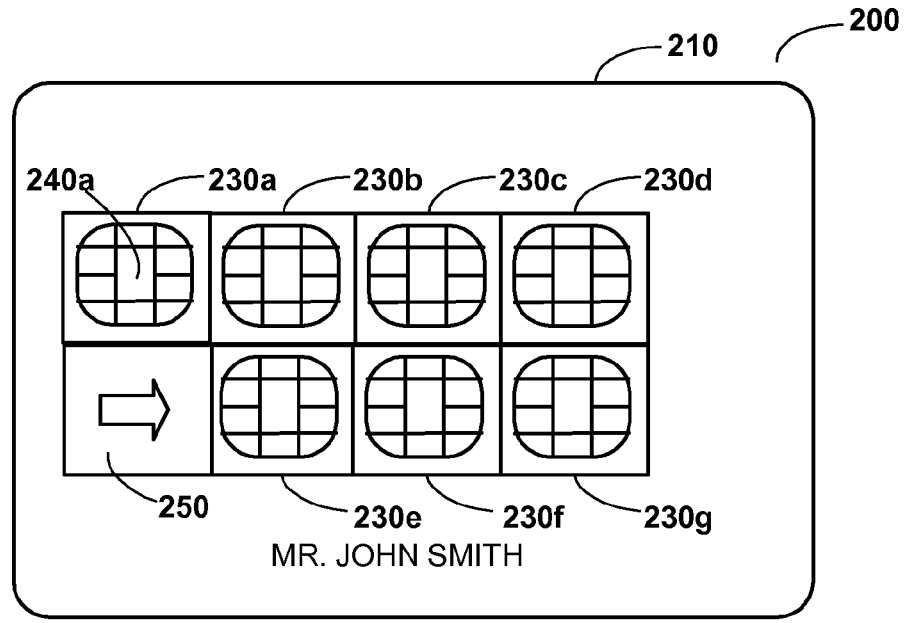
FIGS. 2c to 2f illustrate operation of a multi-chip card according to embodiments of the present invention.

FIG. 2a and FIGS. 2c to 2f illustrate the operation of embodiments of the present invention. In FIG. 2a, sub-card 230a is in the active position in which contacts 240a are read when card 200 is inserted into a card reader. Four sub-cards 230a to 230d occupy the top row of sub-cards in cutaway portion 220 of card body 210. The lower row of sub-cards is occupied by sub-cards 230e to 230g and space 250. This arrangement means that it is impossible for sub-cards on the top row to move in the length direction when the card is inserted into a reader. Likewise, sub-card 230e is directly below sub-card 230a and prevents movement of sub-card 230a in the width direction. Contacts 240a of sub-card 230a are therefore securely located in the active contact position.

Figure 2D:
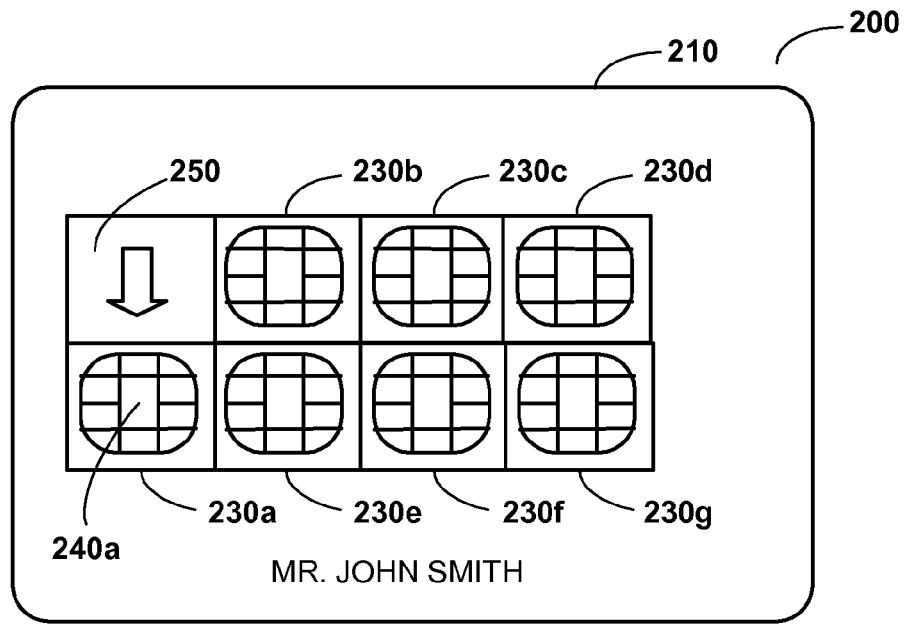
Figure 2E:
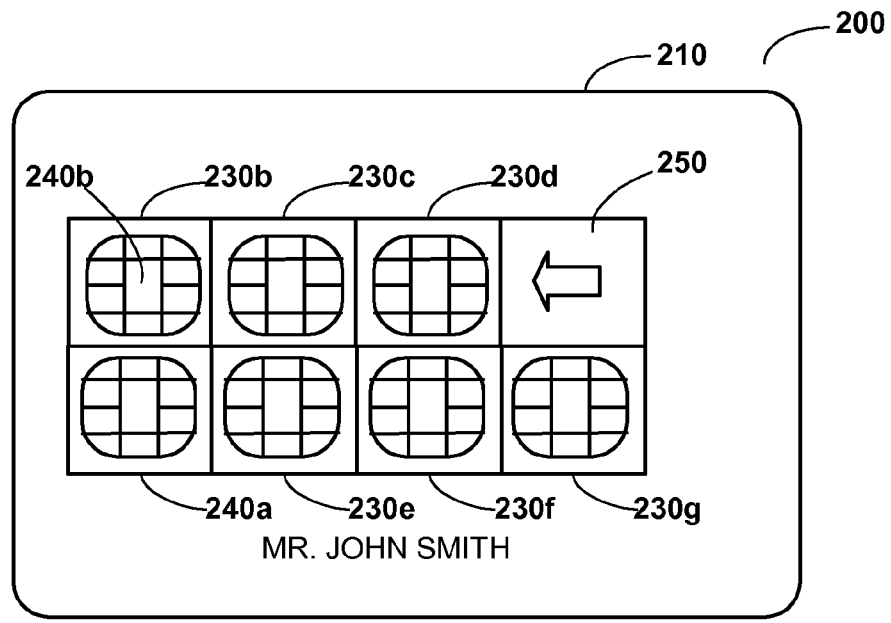
Figure 2F:
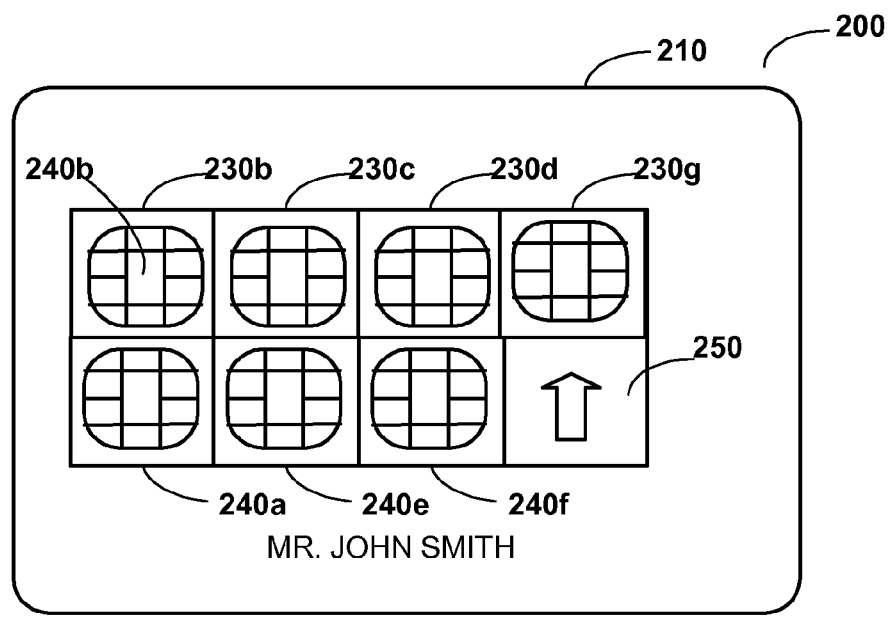

Assume that a user of card 200 now desires to access the functions embodied by the integrated circuit chip of sub-card 230b. The user must therefore move sub-cards 230a to 230g so as to position sub-card 230b in the active position. In FIG. 2c, the user moves sub-cards 230e to 230g to the right so that 230g occupies the space 250, so that space 250 is now below sub-card 230a. In FIG. 2d, the user moves sub-card 230a down into space 250, which is now in the active position. In FIG. 2e, the user moves sub-cards 230b to 230d to the left into space 250, so that space 250 is now at the right end of the top row. Sub-card 230b is now in the active position so that electrical contacts 240b may now be read when sub-card 200 is inserted into a card reader, and the functions of the integrated circuit of sub-card 230b accessed. Lastly, in FIG. 2f, the user moves sub-card 230g into space 250 on the top row, so that space 250 now occupies the bottom right space. The top row is full of sub-cards, and in this way, sub-card 230b is prevented from moving when card 200 is inserted into a card reader.

Figure 3A:
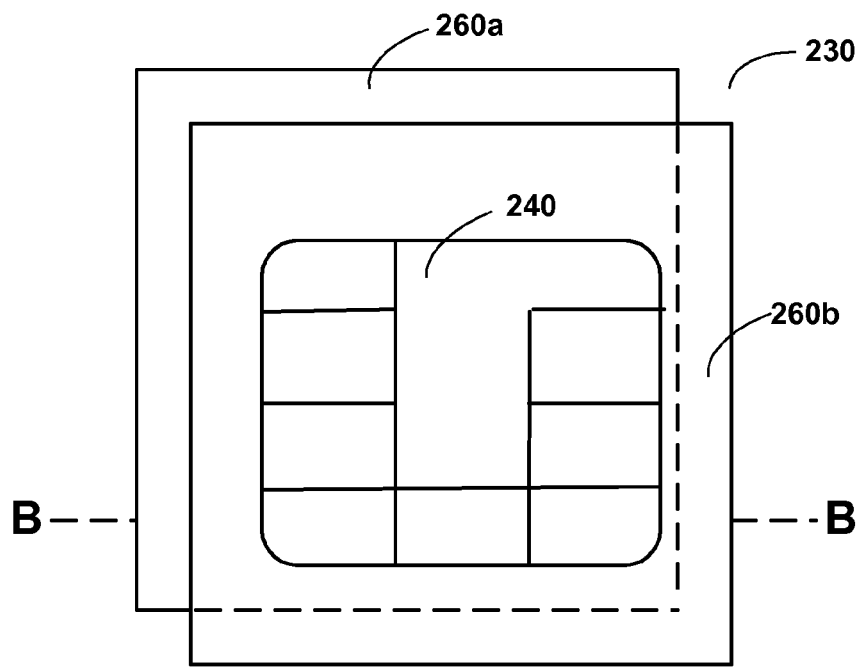
FIG. 3a illustrates a plan view of the electrical contact bearing face of an individual integrated circuit containing sub-card, according to embodiments of the present invention.
Figure 3B:
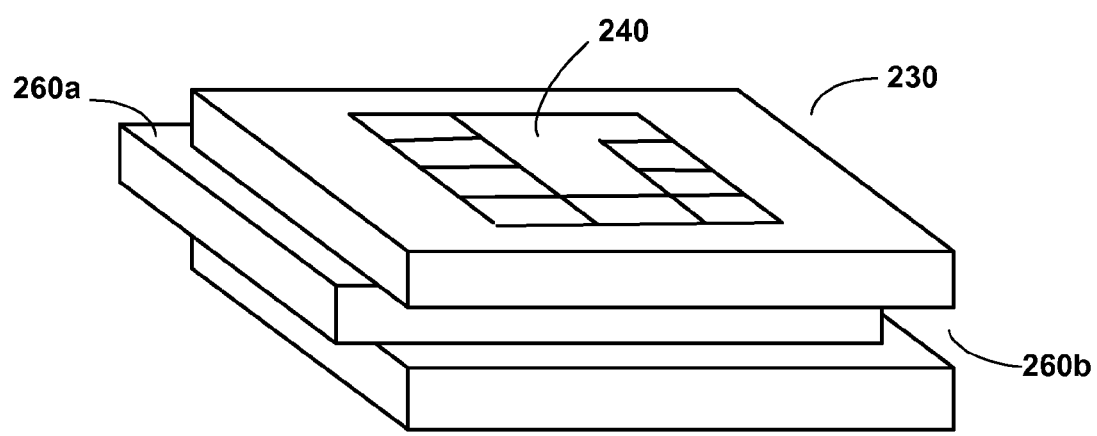
FIG. 3b illustrates a perspective view of an individual integrated circuit containing sub-card, showing the electrical contact bearing face according to embodiments of the present invention.
Figure 3C:
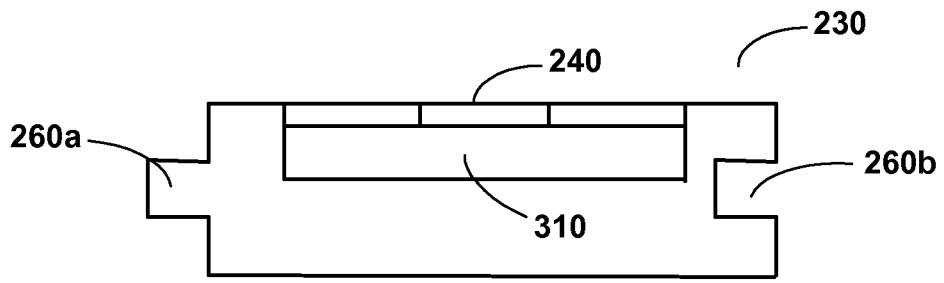
FIG. 3c illustrates a cross-sectional view of an individual integrated circuit containing sub-card, as viewed from its edge or shortest dimension, taken along the section B-B shown in FIG. 3a, according to embodiments of the present invention.

FIGS. 3a to 3c illustrate in more detail the construction of an individual sub-card 230 according to embodiments of the present invention. FIG. 3a is a plan view of a sub-card 230 viewed from its top major face. Sub-card 230 comprises an embedded integrated circuit chip comprising electrical contacts 240. Contacts 240 are faced with an electrically conductive material such as an electrically conductive metal such as gold. Sub-card 230 comprises a protruding member such as tongue 260a along two adjacent edges of the sub-card. The opposite two edges comprise a recessed member such as groove 260b suitable for mateable and slideable engagement with a tongue of similar cross-sectional profile to tongue 260a.

FIG. 3b illustrates a perspective view of a sub-card 230 according to embodiments of the present invention. An embedded integrated circuit chip has electrical contacts 240 on the front major face of the sub-card. In FIG. 3b, tongue 260a is arranged so that its centre in the thickness direction is substantially coincident with the centre of thickness of sub-card 230. Groove 260b is similarly shaped so as to be suitable for mateable and slideable engagement with an adjacent sub-card tongue 260a. Tongues 260a and grooves 260b are similarly suitable for slideable engagement with groove 270a and tongue 270b of cutaway portion 220 of card body 210 (see FIG. 2b).

FIG. 3c illustrates a cross section of sub-card 230 according to embodiments of the present invention, taken for example along the line B-B in FIG. 3a. Sub-card 230 has electrical contacts 240 on its top, or front major face. Contacts 240 connect to integrated circuit chip 310 embedded in sub-card 230. Sub-card 230 has tongues 260a and corresponding grooves 260b.

Figure 4A:
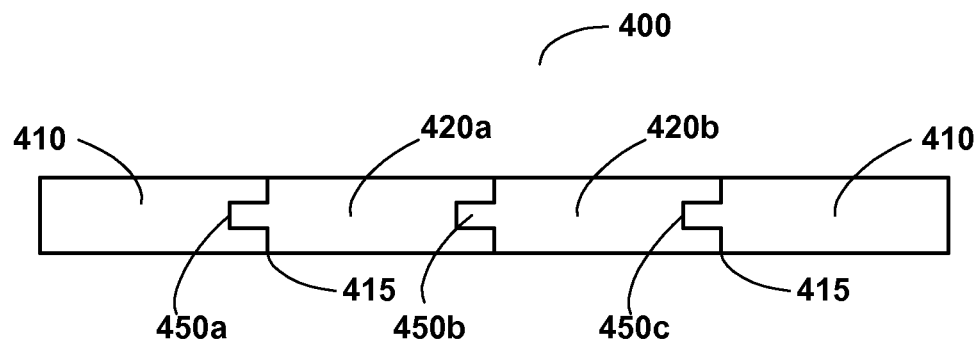

FIG. 4a illustrates a cross section 400 taken through a multi-chip card according to embodiments of the present invention, for example along the line A-A of card 200 of FIG. 2a. In FIG. 4a, card body 410 has cutaway portion 415 corresponding to cutaway portion 220 of FIG. 2a. Cutaway portion 415 is occupied by sub-cards 420a and 420b, corresponding respectively to sub-cards 230b and 230f of FIG. 2a. In embodiments, each of sub-cards 420a and 420b comprises for example a sub-card as described with reference to FIGS. 3a to 3c above. Card body 410 comprises cutaway portion 415 occupied by sub-cards 420a and 420b. Tongue of sub-card 420a mates slideably with groove of card body 410 at 450a. Tongue of sub-card 420b mates slideably with groove of sub-card 420a at 450b. Tongue of card body 410 mates with groove of sub-card 420b at 450c.

Figure 4B:
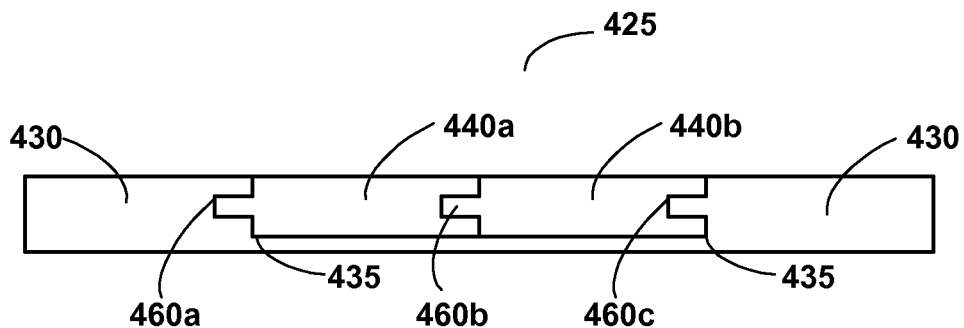

FIG. 4b illustrates a further embodiment of the present invention. In this further embodiment, cross section 425 is also taken through a position corresponding to line A-A illustrated on FIG. 2a. In this embodiment, however, card body 430 comprises cutaway portion 435 which does not extend through the whole thickness of card body 430. In this embodiment, therefore, card body 430 extends over the whole of the bottom surface of cutaway portion 435, thereby covering the whole area indicated by 225 on FIG. 2b. Sub-cards in this embodiment, for example 440a and 440b, must therefore be thinner than sub-cards in previously described embodiments. Tongue of sub-card 440a mates slideably with groove of card body 430 at 460a. Tongue of sub-card 440b mates slideably with groove of sub-card 440a at 460b. Tongue of card body 430 mates with groove of sub-card 440b at 460c.

One potential advantage of the arrangement of this embodiment is that sub-cards are supported over the whole of their back surfaces (the reverse of the major faces comprising electrical contacts).

Figure 5A:
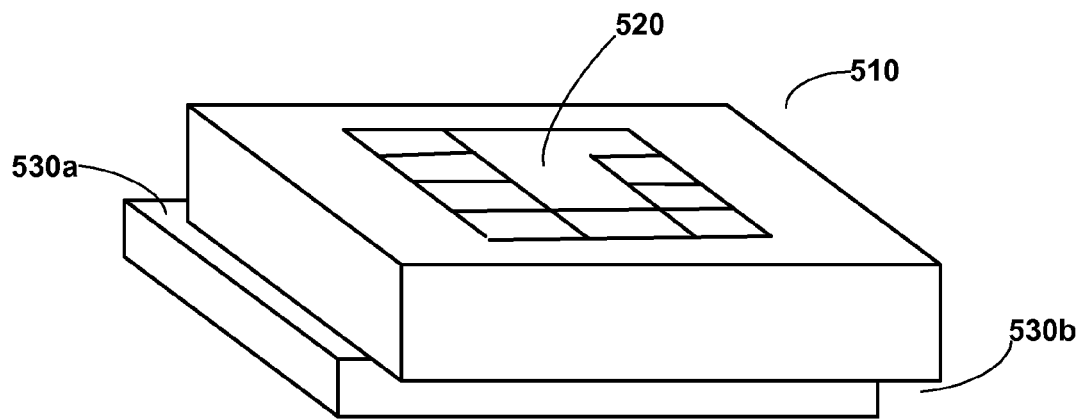
FIG. 5a illustrates a perspective view of an individual integrated circuit containing sub-card, showing the electrical contact bearing face according to additional embodiments of the present invention.
Figure 5B:
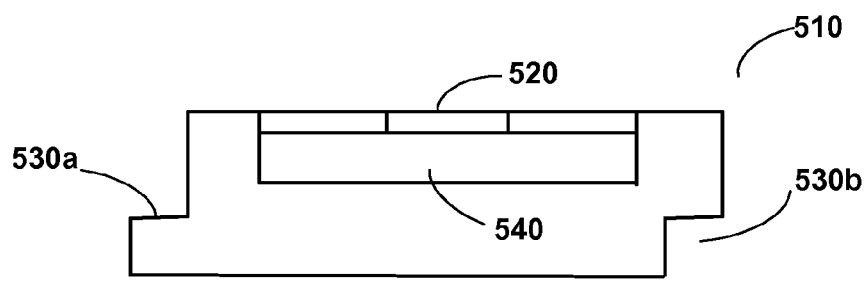
FIG. 5b illustrates a cross-sectional view of an individual integrated circuit containing sub-card, as viewed from its edge or shortest dimension, taken along the section B-B shown in FIG. 3a, according to additional embodiments of the present invention.
Figure 5C:
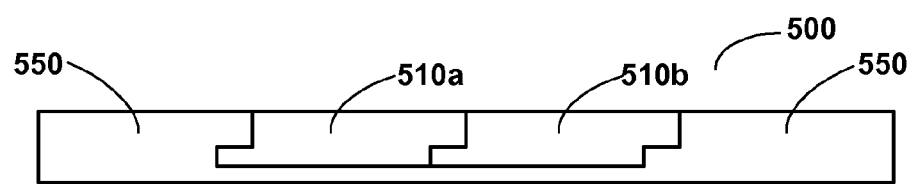

Another embodiment of the present invention is illustrated in FIGS. 5a to 5c. In this embodiment, the slideably engageable arrangement extends flush with the bottom surface of each sub-card. In FIG. 5a, a perspective view of sub-card 510 comprises electrical contacts 520 on top major face of sub-card 510. Extension 530a and indented portion 530b perform the function of tongue and groove slideable mating of the previously described embodiments. FIG. 5b illustrates a cross section corresponding to line B-B on FIG. 3a.

Integrated circuit chip 540 of sub-card 510 has contacts 520 on its top major face. FIG. 5c is a cross section 500 through a multi chip card according to this embodiment, and corresponds to the line A-A in FIG. 2a. In FIG. 5c, card body 550 extends over the whole of the bottom of cutaway portion 525. This is similar to the embodiment illustrated in FIG. 4b.

Figure 6A:
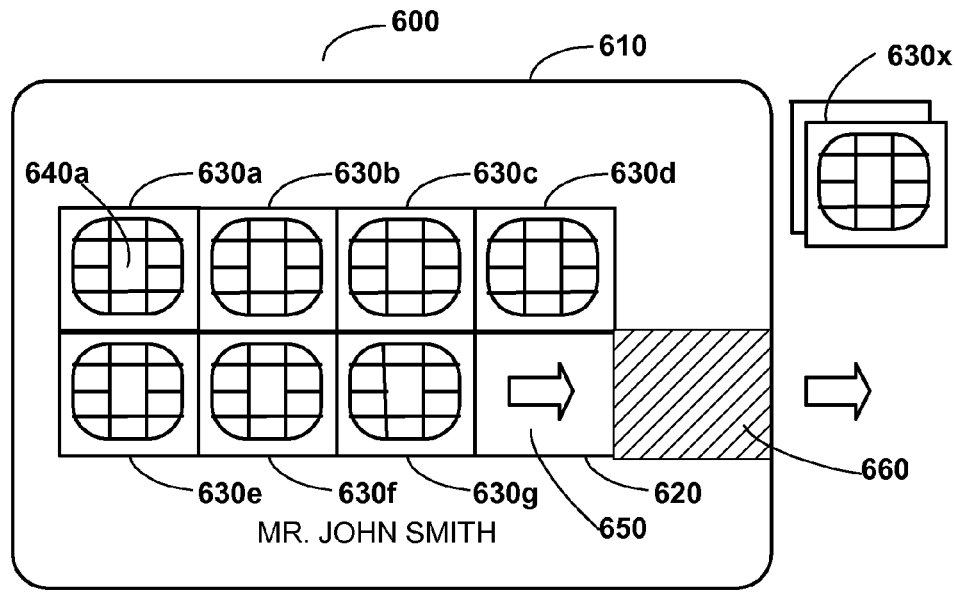
FIGS. 6a to 6d illustrate the replacement of an individual integrated circuit containing sub-card by a different integrated circuit containing sub-card, according to further embodiments of the present invention.

Yet another embodiment of the present invention is illustrated in FIGS. 6a to 6d. In this embodiment, the multi-chip card 600 in FIG. 6a is provided with a facility to change the sub-cards loaded in cutaway portion 620 of card body 610. In other respects, card 600 functions as described for multi-chip cards of one or another of the previously described embodiments. In FIG. 6A, a user of card 600 desires to introduce a new sub-card 630x into the collection of sub-cards in multi-chip card 600. Card body 610 of card 600 comprises removable section 660 which may have substantially the same thickness dimension as each individual sub-card 630a to 630g and 630x. Removable section 660 also comprises a slideable mating arrangement as provided for individual sub-cards such as a tongue and groove arrangement as described with reference to previously described embodiments.

Figure 6B:
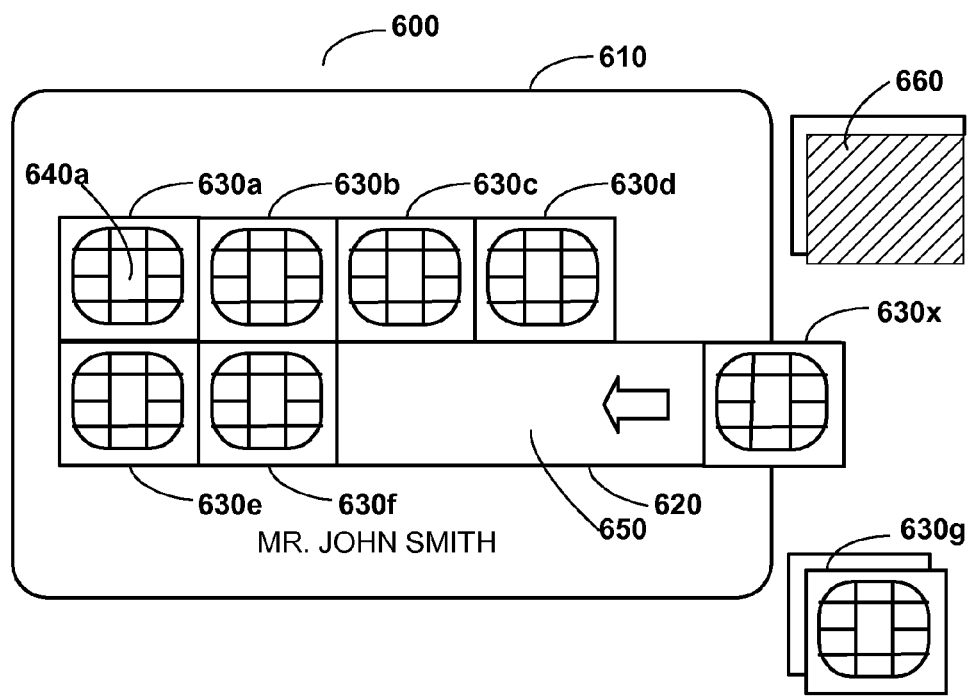
Figure 6C:
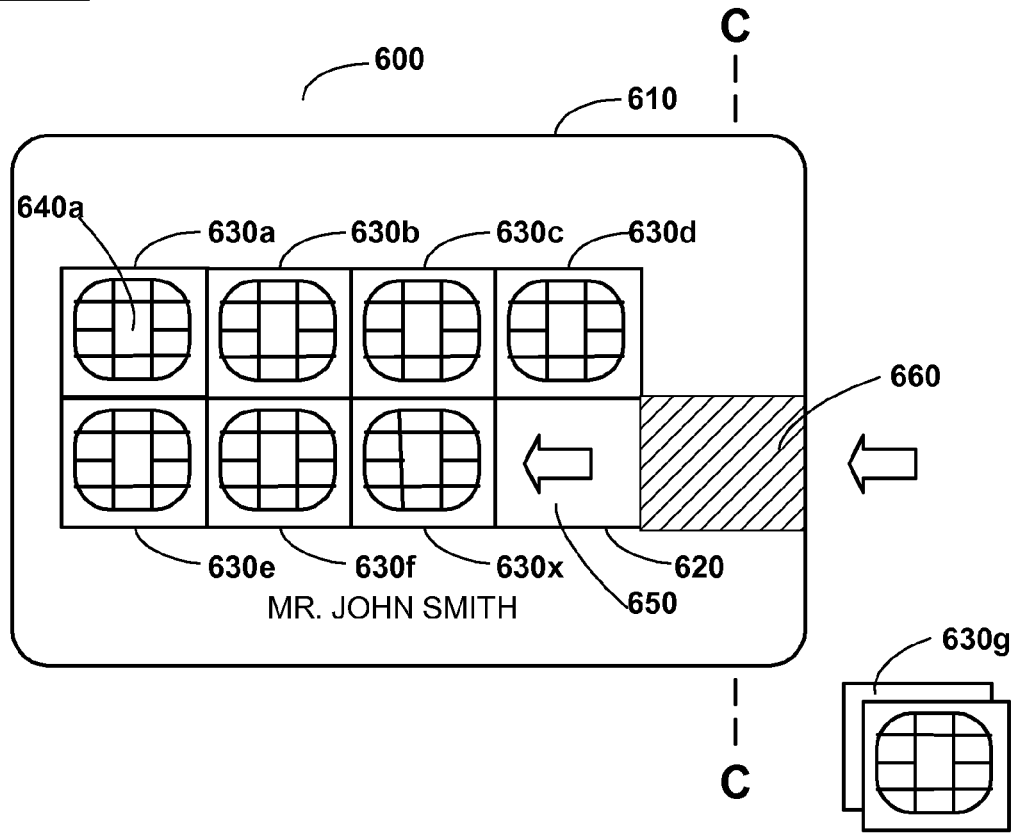
Figure 6D:
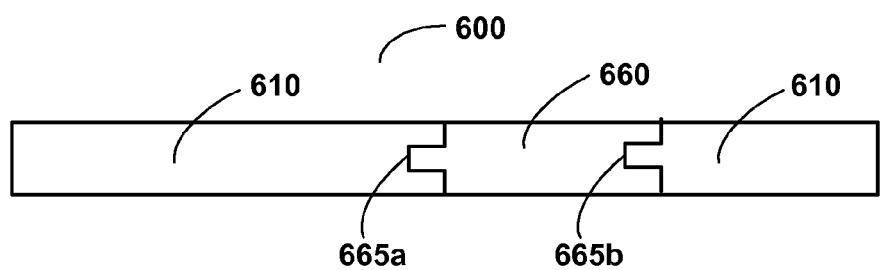

Removable section 660 is removed by sliding out in the direction as shown in FIG. 6a. A single sub-card 630g is also then removed by sliding through the channel left by the removal of section 660. FIG. 6b illustrates the insertion of replacement sub-card 630x by sliding along the channel into cutaway portion 620. In FIG. 6c, removable section 660 is replaced by sliding into the channel to retain the inserted sub-cards. FIG. 6d illustrates a cross section of card body 610 of card 600 taken along the line C-C shown in FIG. 6c. Removable section 660 has tongue at 665a mating with groove of channel in card body 610. Likewise removable section 660 has groove at 665b mating with tongue of card body 610 channel. It will be apparent that although a tongue and groove arrangement covering the whole thickness of card body 610 has been described with reference to this embodiment as illustrated for example in FIG. 4a, any other suitable slideable mating engagement may be used, for example as described with reference to embodiments as illustrated in FIG. 4b or in FIG. 5c. It will also be apparent that with the currently described embodiment there is no requirement to leave a space 650 in cutaway section 620 to allow sub-cards 630 to be moved. This is because removable section 660 may be removed followed by the removal of a convenient sub-card to create a space 650 for sub-card movement as required.

Figure 7:
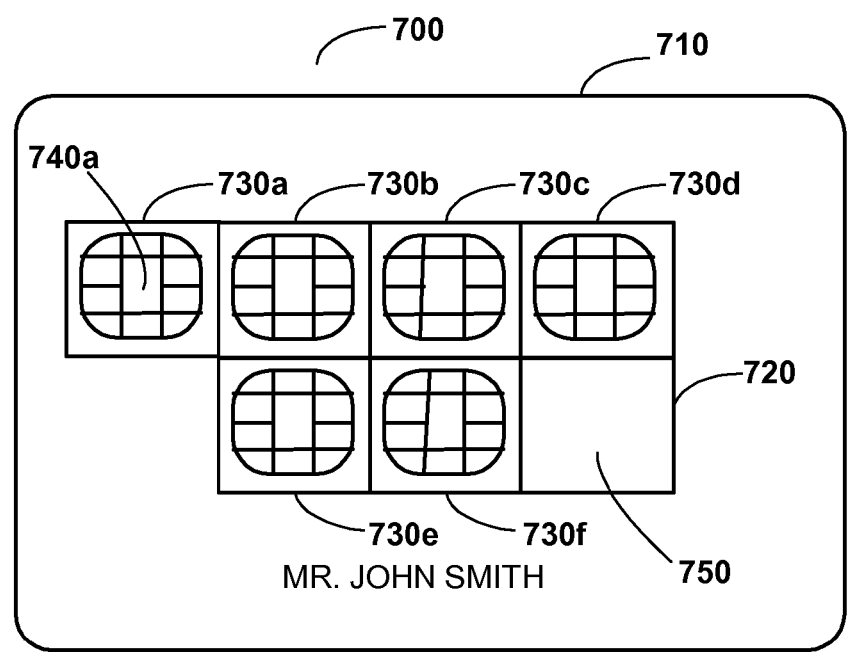
FIG. 7 illustrates further embodiments of the present invention in which the central cutaway section is not rectangular in shape, but rather L-shaped as viewed from the front face of the multi-chip card of the present invention.

FIG. 7 illustrates yet another exemplary embodiment of the present invention. In this embodiment, multi-chip card 700 has card body 710 comprising cutaway section 720 which is L-shaped as viewed from the top major face of the card 700. Sub-cards 730a to 730f are provided in cutaway section 720 with space 750 allowing sub-cards to be moved as in previously described embodiments. As illustrated, sub-card 730a is in the active position so that electrical contacts 740a of sub-card 730a may be contacted when card 700 is inserted into a card reader to allow the contents of the integrated circuit of sub-card 730a to be addressed.

In further embodiments, one or more sub-cards may comprise a construction different from that described for sub-card 230 illustrated in FIGS. 3a to 3c. For example, in an embodiment, one or more of the sub-cards may comprises a non-contact integrated circuit chip addressed by means of, for example, short range wireless technology. In another embodiment, one or more of the sub-cards may comprise a dummy, or blank, sub-card which does not comprise an integrated circuit chip. The blank sub-card is provided to make up the number of sub-cards where the number of sub-cards comprising integrated circuit chips is lower than that required to occupy the card body cutaway portion in the embodiments previously described.

In further embodiments of the present invention, methods of manufacturing multi-chip cards of the previously described embodiments are provided. With reference to the embodiment illustrated in FIG. 2a, smart card body 210 of smart card 200 may be manufactured separately from each of the sub-cards 230a to 230g. Card body 210 may be formed in a similar manner as is known in the art for the manufacture of currently available chip cards. In an embodiment, a substrate, for example a polyvinyl chloride or similar plastic sheet, is stamped or cut or otherwise formed from a sheet of the material. It is then covered with a layer front and back with the printed indicia required for the card description, followed by a layer of transparent overlay, and the whole assembly laminated using any suitable lamination technique as known in the prior art. In a further embodiment, card body 210 may be formed by moulding, for example by injection moulding. In this case, card body 210 may be formed from an acrylonitrile butadiene styrene (ABS) plastic. In a further embodiment, card body 210 may be formed from a paper-based substrate, or other biodegradable material, for example by stamping or cutting from a sheet of the substrate material. In each case, the cutaway section edge profile 270a, 270b, may be formed by any suitable technique, for example by cutting or during the moulding process, as appropriate.

In a further embodiment, a sub-card, such as sub-card 230, may be manufactured by a technique similar to that used for the formation of known chip cards. The integrated circuit chip and its contacts may be manufactured using any of the techniques as known in the prior art for manufacturing known chip cards of the contact type. It is typically then embedded in a suitable material, such as an epoxy resin, to form a package. As for card body 210, the body of the sub-card 230 may be manufactured in a manner similar to the method for making a conventional chip card body, as known in the art. The chip package is attached in a shaped recess in a sub-card body by gluing or other suitable attachment method. In like manner as for card body manufacture, the edge profile 260a, 260b, of the sub-card 230 may be formed by any suitable technique, for example by cutting or during moulding, as appropriate.

It will be understand that the above description covers a number of embodiments which are described by way of example only, and are not intended to be limiting. It will be understood that other constructions, methods of use and methods of manufacture may be envisaged without departing from the scope of the invention as described in the attached claims.

The invention claimed is:

1. A multi-chip card, comprising:
   a plurality of sub-cards, at least one of the plurality of sub-cards comprising an integrated circuit chip, the integrated circuit chip comprising electrical contacts; and
   the at least one of the plurality of sub-cards configured for moving to occupy an active position of the card.

2. The multi-chip card of claim 1, wherein the multi-chip card is configured for insertion into a chip card reader, and wherein the electrical contacts of the integrated circuit chip at the active position are configured for communicating with the reader by electrical contacts in the reader.

3. The multi-chip card of claim 1, wherein the multi-chip card further comprises:
   a card body, comprising:
     a plurality of edges along a periphery of the card; and
     a cutaway portion spaced from one of the plurality of edges of the card body, wherein the cutaway portion comprises a plurality of edges arranged substantially parallel to or at right angles to the one of the plurality of card body edges, and wherein the cutaway portion extends at least part way through a thickness of the card body.

4. The multi-chip card of claim 3, wherein the at least one of the plurality of sub-cards comprises a front face comprising electrical contacts, and wherein the at least one of the plurality of sub-cards further comprises edges which are configured for slideable engagement with an edge of the card cutaway portion and an edge of an adjacent sub-card.

5. The multi-chip card of claim 4, wherein the sub-cards are slideably engageable by respective complementing protruding and recessed edge profiles of sub-cards and the card cutaway portion.

6. The multi-chip card of claim 5, wherein the slideable engagement is by a tongue and groove mechanism.

7. The multi-chip card of claim 3, wherein the card body comprises a section extending between the cutaway portion and a card body edge, the section configured for removal from the card body to allow a sub-card to be removed from or added to the card body.

8. A method of manufacturing a multi-chip card, comprising:
   providing a card body, the card body comprising:
     a plurality of edges along a periphery of the card; and
     a cutaway portion spaced from one of the plurality of edges of the card body, wherein the cutaway portion comprises a plurality of edges arranged parallel to or at right angles to the one of the plurality of card body edges, and wherein the cutaway portion extends at least part way through a thickness of the card body;
   providing adjacent the card body:
     a plurality of sub-cards, at least one of the plurality of sub-cards comprising an integrated circuit chip, the integrated circuit chip comprising electrical contacts, and the at least one of the plurality of sub-cards further comprising edges which are configured for slideable engagement with an edge of the card cutaway portion and an edge of an adjacent sub-card; and
   inserting a plurality of sub-cards into the cutaway portion.

9. The method of manufacturing a multi-chip card of claim 8, wherein the card body comprises a section extending between the cutaway portion and a card body edge, the section configured for removal from the card body to allow a sub-card to be removed from or added to the card body.

10. A method of using a multi-chip card, comprising:
    providing a plurality of sub-cards, at least one of the plurality of sub-cards comprising an integrated circuit chip, the integrated circuit chip comprising electrical contacts;
    the at least one of the plurality of sub-cards being configured for moving to occupy an active position of the card;
    inserting the card into a chip card reader such that the electrical contacts of the integrated circuit chip at the active position are configured for communicating with the reader by electrical contacts in the reader; and
    addressing the integrated circuit chip at the active position by the card reader.

11. The method of using a multi-chip card of claim 10, wherein the at least one of the plurality of sub-cards comprises a discrete function relative to a second of the plurality of sub-cards.

12. The method of using a multi-chip card of claim 11, further comprising:
    moving the at least one of the plurality of sub-cards from the active position of the card; and
    moving another one of the at least one of the plurality of sub-cards to occupy the active position of the card.

13. The method of using a multi-chip card of claim 12, further comprising slideably moving the sub-cards relative to one another.

* * * * *